United States Patent [19]
Glemza et al.

[11] Patent Number: 5,292,701
[45] Date of Patent: Mar. 8, 1994

[54] HIGH PORE VOLUME AND PORE DIAMETER ALUMINUM PHOSPHATE AND METHOD OF MAKING THE SAME

[75] Inventors: Rimantas Glemza, Baltimore, Md.; Yves O. Parent, Golden, Colo.

[73] Assignee: W. R. Grace & Co.-Conn., New York, N.Y.

[21] Appl. No.: 698,524

[22] Filed: May 10, 1991

Related U.S. Application Data

[63] Continuation-in-part of Ser. No. 362,545, is a continuation-in-part of Ser. No. 188,808, May 2, 1988, abandoned, which is a continuation of Ser. No. 770,550, Aug. 29, 1985, abandoned.

[51] Int. Cl.$^5$ ............................................ B01J 21/02
[52] U.S. Cl. ................................. 502/202; 502/208; 502/210; 502/214; 423/305; 423/306
[58] Field of Search ............... 502/202, 208, 210, 214; 423/305, 306

[56] References Cited

U.S. PATENT DOCUMENTS

| | | | |
|---|---|---|---|
| 3,342,750 | 9/1967 | Kearby | 252/437 |
| 3,904,550 | 9/1975 | Pine | 252/437 |
| 4,066,572 | 1/1978 | Choca | 502/208 |
| 4,080,311 | 3/1978 | Kehl | 252/437 |
| 4,196,099 | 4/1980 | Hunter et al. | 502/210 |
| 4,210,560 | 7/1980 | Kehl | 252/437 |
| 4,219,444 | 8/1980 | Hill et al. | 502/210 |
| 4,288,346 | 9/1981 | Hunter et al. | 502/210 |
| 4,289,652 | 9/1981 | Hunter et al. | 502/210 |
| 4,289,863 | 9/1981 | Hill et al. | 502/210 |
| 4,310,440 | 1/1982 | Wilson et al. | 502/208 |
| 4,364,842 | 12/1982 | McDaniel et al. | 252/430 |
| 4,385,994 | 5/1983 | Wilson et al. | |
| 4,444,965 | 4/1984 | McDaniel et al. | 423/308 |
| 4,535,070 | 8/1985 | McDaniel et al. | 502/208 |
| 4,547,479 | 10/1985 | Johnson et al. | 502/210 |
| 4,769,429 | 9/1988 | Furtek | |

FOREIGN PATENT DOCUMENTS

| | | | |
|---|---|---|---|
| 65620 | 5/1974 | Australia. | |
| 0055958 | 7/1982 | European Pat. Off. | 502/210 |
| 0090374 | 10/1983 | European Pat. Off. | |
| 0215336 | 3/1987 | European Pat. Off. | |
| 2090157 | 7/1982 | United Kingdom | 502/210 |

OTHER PUBLICATIONS

Moffat, J. B., "Phosphates as Catalysts", *Catal. Rev.—Sci. Eng.* 18(2), pp. 199–258 (1978).

Kearby, K., "New AlPO$_4$ Gels and Acid Catalysts", *Proceedings on the 2nd International Congress on Catalysis*, Paris 1960.

Marcelin, G., "Alumina–Aluminum Phosphate as a Large Pore Support and Its Application to Liquid Phase Hydrogenation", *J. of Catal.* 83, 42–49 (1983).

Advances in Catalysis, vol. 33, edited by Eley et al, 1985, Academic Press Inc., pp. 76, 87, 88.

Grebenko et al., "Synthesis and Study of Porous Aluminophosphates"; *Inorg. Chem* (86:507); 1977.

Rebenstorf et al., "Amorphous AlPO$_4$ as Catalyst Support. 1. FTR Study of CO Adsorbed on Chromocene and Trimethylsilylchromocene Reacted with AlPO$_4$," *Acta Chemica Scandinavica*, vol. 44, pp. 789–792 (1990).

Rebenstorf et al., "Amorphous AlPO$_4$ as Catalyst Support. 2. Characterization of Amorphous Aluminum Phosphates," *J. Catalysis*, vol. 128, pp. 293–302 (1991).

Rebenstorf et al., "Amorphous AlPO$_4$ as Catalyst Support. 3. CO FTIR Study of AlPO$_4$ Impregnated with Chromium," *J. Catalysis*, vol. 128, pp. 303–310 (1991).

*Primary Examiner*—George Fourson
*Attorney, Agent, or Firm*—Steven Capella

[57] ABSTRACT

Aluminum phosphate compositions are provided which are characterized simultaneously by high porosity and phosphorous-to-aluminum ratios of approximately 1.0. The high porosity of these compositions is a function of high pore volume coupled with low surface area, resulting in high average pore diameter. These materials have excellent properties as catalysts and catalyst supports. Methods of making the compositions are also provided.

16 Claims, No Drawings

HIGH PORE VOLUME AND PORE DIAMETER ALUMINUM PHOSPHATE AND METHOD OF MAKING THE SAME

This application is a continuation-in-part of copending U.S. Ser. No. 362,545, "High Pore Volume and Pore Diameter Aluminum Phosphate" (R. Glemza), filed Jun. 7, 1989, now U.S. Pat. No. 5,030,431, which is a continuation-in-part of U.S. Ser. No. 188,808, filed May 2, 1988, which is a continuation of U.S. Ser. No. 770,550, filed Aug. 29, 1985, both now abandoned.

BACKGROUND OF THE INVENTION

This invention is for aluminum phosphate compositions which are characterized by having both high porosity and phosphorus-to-aluminum (hereinafter "P/Al") ratios near unity. The high porosity of these compositions is characterized by a combination of high pore volume and low surface area, resulting in high average pore diameter. These compositions are useful as cracking catalysts, supports for ethylene polymerization catalysts, flatting agents, carriers, adsorbents and thickeners.

Synthetic aluminum phosphates are known and the utility and properties of various compositions have been discussed extensively in the literature. For example, Kearby, 2nd Int'l Congress and Catalysis, "New AlPO$_4$ Gels As Acid Catalysts," pp. 2567-79 (1960, Paris) and Moffat, Catal. Rev.—Sci. Eng., "Phosphates As Catalysts," Vol. 19, pp. 199-258 (1978) discuss the properties of various aluminum phosphates, reporting surface areas of about 200.0 to 500.0 m$^2$/gm and pore volumes (hereinafter "PV") of about 0.45 to 0.78 cc/gm.

Aluminum phosphate-containing compositions also have been described, as in U.S. Pat. No. 3,904,550 (Pine) which discloses a catalyst support comprised of alumina and aluminum phosphate with P/Al=0.54 and PV=1.34 cc/gm; U.S. Pat. No. 4,210,560 (Kehl) which discloses magnesia-alumina-AlPO$_4$ catalyst supports with P/Al=0.21 and PV=1.11 cc/gm or with P/Al=0.69 and PV=0.72 cc/gm; and Marcelin et al., J. of Catal., "Alumina-Aluminum Phosphate As Large-Pore Support and Its Application to Liquid Phase Hydrogenation," Vol. 83, pp. 42-49 (1983) which discloses alumina-aluminum phosphate supports with P/Al=1.0 and PV=0.32 cc/gm or with P/Al=0.5 and PV=0.64 cc/gm.

U.S. Pat. Nos. 4,364,842 and 4,444,965 (McDaniel et al.) disclose aluminum phosphate-containing catalyst bases in which P/Al=0.7-0.9 and in which the highest PV disclosed was 0.84 cc/gm (for P/Al=0.80).

Many of the prior art compositions share the same limitation. As the P/Al approaches unity, the pore volume of the prior art compositions decreases. Typically, aluminum phosphate compositions were not prepared with both these characteristics: a P/Al near unity and a high pore volume (i.e., PV of at least 1.0 cc/gm). High pore volume is very desirable for aluminum phosphate compositions used as polymerization catalysts due to their polymerization characteristics.

U.S. Pat. No. 3,342,750 (Kearby) discloses aluminum phosphate gels with PV of 1.39-156 cc/gm and surface area (hereinafter "SA") of 427-523 m$^2$/gm, resulting in average pore diameters of 65-114 Angstroms. Kearby teaches a high PV composition which also has a P/Al near unity, but it can be seen that the high PV is achieved at the expense of pore diameter, which is low.

It is taught, in U.S. Pat. No. 4,769,429 (Furtek), that high average pore diameter is a very desirable characteristic for polymerization catalysts.

In providing catalyst supports with high PV and low SA, the compositions of the invention achieve this combination of properties and provide aluminum phosphate catalyst supports having high average pore diameters. Moreover, these unique characteristics of the present catalyst supports dramatically affect the characteristics of the reaction products (e.g., polyethylene). Use of the catalyst supports of this invention yields polyethylene products having different and advantageous properties, such as melt index (MI) and high load melt index (HLMI) (see Example V below), as compared with products made using the prior art catalyst supports. For example, EP 56 164 (Phillips Petroleum) (McDaniel et al.), teaches in Table 1 that MI is 0 and HLMI is far below 1 unless an additive such as triethyl borane or hydrogen is used. By contrast, the high porosity supports of this invention achieve HLMI of 8.9 in the absence of any additive.

SUMMARY OF THE INVENTION

The compositions defined and described herein are aluminum phosphate compounds with a unique combination of properties. These aluminum phosphates are characterized by high porosity. The compositions combine high pore volumes of at least 1.0, preferably at least 1.3 cc/gm, with low surface areas of 200-400 m$^2$/gm, resulting in high average pore diameters of at least 125 Angstroms, preferably at least 150 Angstroms. At the same time, the ratio of phosphorus to aluminum in the compositions is close to unity.

It is the primary object of this invention to provide stoichiometric aluminum phosphates with high porosity. Compositions of this description find particular utility when used as cracking catalysts or as supports for polymerization catalysts. A related object is to provide polymerization catalysts in which the catalytically active ingredients either are incorporated into the aluminum phosphate support of this invention by cogelling or by post-impregnation. It is also an object to provide high pore volume and high average pore diameter aluminum phosphates which are useful as flatting agents, flavor carriers, adsorbents and thickeners.

An additional object is to provide an improved process for preparing the described aluminum phosphates.

DETAILED DESCRIPTION OF THE INVENTION

High porosity stoichiometric aluminum phosphate compositions are described herein. The compositions of this invention comprise aluminum phosphate in which phosphorus and aluminum are present in a ratio of close to unity. For purposes of this description, close to unity shall mean that the ratio is at least 0.8, preferably at least 0.9, and most preferably closer to 1.0. If the ratio of a given composition is not precisely 1.0, aluminum should predominate over phosphorus. The described aluminum phosphates are further characterized by high pore volume and low surface area, resulting in high average pore diameter. This combination of characteristics is referred to herein as "high porosity." Pore volume is at least 1.0, preferably at least about 1.3 cc/gm, and surface area is between about 200 and about 400 m$^2$/gm. The compositions are thermostable up to at least 700° C. and are further characterized by a lack of crystallinity, that is, they will remain amorphous, even at temperatures in that vicinity. These properties make the aluminum phosphates of this invention ideal for catalyst applications.

The aluminum phosphates of this invention are conveniently prepared by the following method, although variations may be suitable. The compositions are made by neutralization of an acidic aqueous solution of aluminum and phosphate ions. Suitable solutions may be formed from aluminum salts and phosphate salts. The aluminum salts may be aluminum nitrate ($Al(NO_3)_3 \cdot 9H_2O$), aluminum chloride hydrate ($AlCl_3 \cdot 6H_2O$), aluminum bromide ($AlBr_3 \cdot 6H_2O$), aluminum bromate ($Al(BrO_3)_3 \cdot 9H_2O$), aluminum chlorate ($Al(ClO_3)_3 \cdot 6H_2O$), or aluminum iodide hydrate ($AlI_3 \cdot 6H_2O$). The phosphate salts may be orthophosphoric acid ($H_3PO_4$), ammonium phosphate ($NH_4H_2PO_4$), ammonium phosphate, dibasic (($NH_4)_2HPO_4$) or other soluble alkali phosphates. The preferred salts are aluminum nitrate and ammonium phosphate.

Stoichiometric amounts of the aluminum and phosphate salts are preferred, as described above. Use of P/Al ratios of 0.8 to 1.0 is significant in that the resulting solution yields a single phase, clear (i.e., homogeneous), bulk hydrogel upon neutralization. This contrasts with prior art aluminum phosphate compositions such as disclosed in U.S. Pat. No. 4,364,842 (McDaniels) in which the lower P/Al results in a white gelatinous precipitate, which is considered to be a two-phase system of precipitate and hydrogel.

The selected salts (one or more, each, of aluminum and phosphate) are dissolved in water, in a P/Al of approximately 1.0, to form an acidic aqueous solution, pH about 2.0. It may be necessary to heat the water slightly to form a solution. The solution is then cooled. For reasons of economy, ambient temperatures are preferred for the preparation of the hydrogel, but the composition may be kept slightly warmer or cooler if desired. Alternatively, an aqueous aluminum nitrate solution may be used (for example a solution which contains about 60 wt % of the hydrated salt).

In one preferred embodiment, a hydrogel is prepared by partially neutralizing the acidic aqueous solution and then allowing the partially neutralized composition to gel. Neutralization to 90–100% is preferred, although the calculated percent neutralization may be somewhat over 100%. The pH of the neutralized composition is not critical but it should be kept low enough to avoid precipitation. The quantity of base used in this step is calculated from the stoichiometry of the reaction. One hundred percent neutralization refers to conversion of all nitrate to $NH_4NO_3$, which has a pH of 3.5 to 4.5 in water. Thus, at 100% neutralization, the pH will be about 4.0.

Ammonium hydroxide, preferably 30% ammonia, is conveniently used for neutralization. The base is added to the aqueous aluminum phosphate solution slowly, to avoid formation of a precipitate, and with vigorous agitation. The neutralized solution, now a viscous mass, forms a clear, homogeneous hydrogel at ambient temperatures. Typically, after about 3.0 hours the gel is firm enough to be handled in the subsequent processing steps.

Continuing in this first preferred embodiment, the resulting aluminum phosphate hydrogel is subjected to a second neutralization. The hydrogel, which may be cut into chunks or pieces for ease in handling, is soaked in an aqueous basic solution. The basic solution must be of sufficient volume to cover the hydrogel and of sufficient strength to yield an end pH of about 8.0 to 9.0. Ammonium hydroxide is preferred, although sodium hydroxide also may be used. The hydrogel is removed from the soak solution and washed thoroughly with hot dilute base, such as ammonium hydroxide or ammonium carbonate, dibasic. It is preferred to use ammonium hydroxide (pH 10.0) at about 60.0° to 90.0° C., preferably about 85.0° C., in a continuous flow-through system, washing for about 10.0 to 30.0 hours.

This hot base wash strengthens the hydrogel structure and maximizes the porosity of the aluminum phosphate compositions during water removal. Thus, the method of hydrogel preparation described above results in a homogeneous bulk hydrogel with good pore volume in the initial gel structure and in which the potential pore volume is essentially preserved by the hot base washing step.

The washed hydrogel is exchanged with any alcohol soluble in water, or with acetone or ethyl acetate, in several soak/drain steps, for example, about 6–8 soak/drain repetitions. Alternatively, the washed hydrogel may be exchanged with heavier alcohols, such as n-hexanol, followed by azeotropic distillation. The hydrogel is then dried to the desired total volatiles (TV) content, which will depend on the particular use intended for the aluminum phosphate composition.

The result of either method, or variations thereof, is the preparation of aluminum phosphate compositions with P/Al of 0.8 to 1.0 which exhibit exceptionally high porosity. The compositions have high pore volumes of at least 1.0 cc/gm, preferably at least about 1.3 to 1.6 cc/gm. These pore volumes represent almost twice as much porosity as the pore volumes of most prior aluminum phosphate compositions at similar P/Al. For example, McDaniel '842 discloses a composition at P/Al=8.0 which has a pore volume of only 0.84 cc/gm.

As a key to this invention, the high pore volumes as described are uniquely combined with relatively low surface area. For example, the surface area of the inventive compositions preferably is about 200–400 $m^2$/gm. This combination assures the high porosity of the aluminum phosphates of the present invention. As described below, these compounds necessarily have high average pore diameters.

In a second preferred embodiment, a hydrogel is prepared by partially neutralizing the acidic aqueous solution and then allowing the partially neutralized composition to gel. Neutralization to about 60 to 70% is preferred. The pH of the partially neutralized composition is not critical but it should be kept low enough to avoid precipitation. The quantity of base used in this step is calculated from the stoichiometry of the reaction. One hundred percent neutralization refers to conversion of all nitrate to $NH_4NO_3$, which has a pH of 3.5 to 4.5 in water. Thus, at 100% neutralization, the pH will be about 4.0.

Ammonia as $NH_3$ gas is conveniently used for neutralization. The ammonia gas is added to the aqueous aluminum phosphate solution with mixing sufficient to obtain uniform mixing of the reactants. The ammonia gas may be bubbled or injected into the solution as rapidly as the gas will be taken up by the liquid (i.e., will not simply bubble to the surface or displace the liquid). The actual rate of addition will depend on the system and equipment used; it is within the knowledge and ability of persons of ordinary skill in the art to determine the rate. As an example, it has been found that about 60–70 liters of ammonia gas can be added to about one liter of the solution at a rate of about 5–6 liters per minute, with the bubbles disappearing into the liquid at this rate of addition.

The mixture will gel at about two-thirds neutralization. The partially neutralized solution, now a viscous mass, forms a clear, homogeneous hydrogel which is firm enough to be handled in the subsequent processing steps. A large amount of heat is generated by the neutralization reaction, which will raise the temperature of the gel (e.g., to about 80° C. in a non-insulated vessel). The gelled mass is a semi-solid which fractures like glass upon application of mild shear, but which flows like a plastic fluid upon application of higher shear. The degree of plasticity is variable.

The resulting aluminum phosphate hydrogel is subjected to a second neutralization. The hydrogel, which may be cut into chunks or pieces for ease in handling, is soaked in an aqueous basic solution. The basic solution must be of sufficient volume to cover the hydrogel and of sufficient strength to yield an end pH of about 8.0 to 9.0. Ammonium hydroxide is preferred, although sodium hydroxide also may be used. Where sodium hydroxide is used, care should be taken to ensure that residual sodium is washed out.

The hydrogel preferably is soaked in concentrated base, such as ammonium hydroxide. Soaking allows for neutralization while keeping the hydrogel intact. It is preferred to use concentrated ammonium hydroxide (pH 10.0) at about 60.0° to 90.0° C., preferably about 80° C. For example, in a preferred process, the following materials and proportions may be used: for each mass unit of gel, 1.0 mass unit of de-ionized water is heated to about 80° C. (for acceleration of the process) and mixed with about 0.09 mass units of concentrated ammonium hydroxide solution (about 29 wt %). A solution with lower ammonia content may be used, but it is preferred to have an excess of ammonia beyond that required for neutralization.

Typically, little agitation will be required for this second neutralization step, provided temperatures of about 60° to 90° C., preferably about 80° to 85° C., are achieved and the gel is adequately exposed to the base. For example, sparging, fluidizing or mechanical turning will be adequate. The hydrogel should be soaked for at least about 2.0 hours, preferably at least about 4.0 hours.

As in the first preferred embodiment, the hot base wash strengthens the hydrogel structure and maximizes the porosity of the aluminum phosphate compositions during water removal. Thus, this second method of hydrogel preparation also results in a homogeneous bulk hydrogel with good pore volume in the initial gel structure and in which the potential pore volume is essentially preserved by the hot base soaking step.

A water wash step is used to wash out residual ammonium nitrate salt by-product. Preferably, de-ionized water, pH-adjusted to about 10 with ammonium hydroxide, is used, but pH adjustment may not be required. This step may be done in either a batch or continuous wash operation. Preferably, mixing is limited to reduce generation of particle fines. If desired the water wash step described here can be used in the method of the first preferred embodiment.

The water-washed hydrogel is exchanged with any alcohol soluble in water, or with acetone or ethyl acetate, to preserve the porosity developed in the second neutralization step. The alcohol exchange may be conducted in several soak/drain steps, for example, about 6–8 soak/drain repetitions, or by countercurrent contacting. Alternatively, the washed hydrogel may be exchanged with heavier alcohols, such as n-hexanol, followed by azeotropic distillation. The hydrogel is then dried to the desired total volatiles (TV) content, which will depend on the particular use intended for the aluminum phosphate composition.

A calcination step is preferred in the second embodiment to rid the solid aluminum phosphate composition of residual alcohol and ammonium nitrate. Removal of these residual materials is believed to maximize pore volume in the material. The aluminum phosphate composition prepared from the method of the first embodiment may be calcined, if desired. For example, it is suggested below that the compositions be calcined prior to use as cracking catalysts. However, calcination may not be necessary for first embodiment compositions because residual materials will have been washed out more thoroughly by the process of the first embodiment.

Where calcination is conducted, the time and temperature should be selected to be sufficient to remove residual nitrates. For example, the composition may be calcined for about one hour at 1000.0° F. (538.0° C.), although other times and temperatures may be used. The composition then may be sized as desired.

Aluminum phosphate compositions prepared in this manner can be expected to have the following unique combination of characteristics: The total pore volume (PV) will be at least 1.0 cc/gm, and preferably about 1.3 to 1.6 cc/gm. The surface area (SA), measured by the nitrogen Brunauer-Emmett-Teller (BET) surface area method described in Brunauer et al., J. Am. Chem. Soc., Vol. 60, p. 309 (1938), may range from about 200.0 to 400.0 m$^2$/gm, preferably about 250–400 m$^2$/gm. The indicated combination of high PV and low SA necessarily results in the compositions' porosity being contained in pores such that the average pore diameter (hereinafter "APD") is high. The APD is calculated in the following manner, based on measured PV and SA:

$$APD\ (\text{Å}) = \frac{4 \times PV\ (\text{cc/gm}) \times 10^4}{SA\ (\text{m}^2/\text{gm})}.$$

This formula provides a convenient method of predicting APD. The calculated APD values are verifiable by nitrogen desorption isotherm measurements.

The relationship between PV and SA in this respect can be seen. In the compositions of this invention, having high measured pore volume and low measured surface area, the calculated (or measured) average pore diameter will be high. The high porosity of these compositions is thus based both on high pore volume and on pore volume contained in large diameter pores. The compositions have PV and SA values such that the combination of these two values yield a calculated APD of at least 125Å. More preferably, the calculated APD is at least about 150Å. Other characteristics of these compositions are typical of aluminum phosphates in general.

It is expected that the improved aluminum phosphate compositions o this invention will find utility where conventional aluminum phosphates are used, with the added advantages of their high porosity. For example, the compositions may be used as cracking catalysts after sizing to an average of about 80.0 to 100.0 microns, then heating to about 1000.0° F. (538.0° C.) to remove all ammonia. For use as flatting agents, carriers or thickeners, the compositions are sized to about 1.0 to 20.0 microns, as desired, and typically are used at about 10.0% TV. The compositions also are useful as supports for polymerization catalysts.

Where the compositions are used as supports for polymerization catalysts, the catalytically active agent, i.e., chromium, may be added either by incorporation into the aluminum phosphate gel or by impregnation on the formed support composition. In addition to chromium, other promoters such as boron, silicon or titanium may be present. The active agent or agents may be added initially to the aqueous solution of aluminum and phosphate ions in order to form a cogel with the aluminum phosphate or may be added to the aluminum phosphate material by post-impregnation.

For post-impregnation of the catalytically active agent, the aluminum phosphate supports may be prepared as described above and then impregnated with the desired agent or agents. For example, the dried aluminum phosphate support material may be soaked in a solution of catalyst material (i.e., an isopropanol solution of $Cr(NO_3)_3 \cdot 9H_2O$) and then dried. Typically, about 1.0 to about 5.0% chromium on a total solids basis is used. Any convenient soluble chromium salt may be used, provided that the pH of the solution should not be low enough (i.e., pH less than about 3.0) to dissolve aluminum from the aluminum phosphate composition. In addition, it may be desired to add boron, silicon or titanium. Alternatively, the catalytically active agent or agents may be incorporated into the aluminum phosphate material itself by cogelling. In this embodiment, the agent is added to the initial solution containing aluminum and phosphate ions. For example, chromic nitrate ($Cr(NO_3)_3 \cdot 9H_2O$) may be dissolved in the initial aqueous solution. The catalytically active aluminum phosphate cogel is then prepared according to the procedures described above.

The examples which follow are given for illustrative purposes and are not meant to limit the invention described herein. The following abbreviations have been used throughout in describing the invention:

$AlPO_4$ = aluminum phosphate
Å = Angstroms
APD = average pore diameter
BET = Brunauer-Emmett-Teller
°C. = degrees Centigrade
cc = cubic centimeter(s)
conc = concentrated
D.I. = de-ionized
gal. = gallon(s)
gm = gram(s)
hr = hour(s)
$m^2$ = square meter(s)
min = minute(s)
P/Al = phosphorus-to-aluminum ratio
psig = pounds per square inch gauge
PV = pore volume
% = percent
SA = surface area
SLPM = standard liters per minute
TV = total volatiles
vol = volume
wt = weight

EXAMPLE I

The following ingredients were added to a beaker and heated to about 80° C.: 1,237.5 gm $Al(NO_3)_3 \cdot 9H_2O$ and 198.0 gm $H_2O$. After forming a complete solution, the mixture was stirred and 342.0 gm $NH_4H_2PO_4$ were dissolved in it. The solution was allowed to cool to ambient temperature. The calculated P/Al ratio was 0.90.

First Neutralization—Next, 538.6 gm of the cooled solution were added to a Waring blender and 127.0 cc of concentrated $NH_4OH$ (30% $NH_3$) were added slowly (over 39.0 min) with vigorous agitation. The resulting viscous mass was transferred to a beaker and allowed to stand overnight to gel. The calculated percent neutralization (to $NH_4NO_3$) was 96.0%, and the calculated final solids content as $AlPO_4 + Al_2O_3$ was 17.6%.

Second Neutralization—The aluminum phosphate hydrogel was cut into chunks (about 1.0 inch) and 514.5 gm of chunks were transferred to another beaker, covered with a water solution containing 65.0 cc concentrated $NH_4OH$ and allowed to stand overnight. The soak solution (final pH of 8.5) was decanted and the hydrogel transferred to another container for washing.

Washing—The hydrogel was washed in a continuous flow-through system with 85° C. dilute $NH_4OH$ (pH 10.0) for 19 hours. The washed hydrogel was then exchanged with acetone in seven soak/drain steps, and dried overnight in a vacuum oven at 145° C. The final product was found to have the following properties:

TV (at 1750° F.) = 12.3%
PV = 1.43 cc/gm
BET SA = 380.0 $m^2$/gm
APD = 151Å

EXAMPLE II

The procedures of Example I were followed, with the following differences:

Initial Ingredients $Al(NO_3)_3 \cdot 9H_2O$ = 1200.0 gm
$Cr(NO_3)_3 \cdot 9H_2O$ = 57.6 gm
$NH_4H_2PO_4$ = 331.3 gm
$H_2O$ = 192.0 gm
Calculated P/Al = 0.90
Calculated P/(Al+Cr) = 0.86

First Neutralization

Wt. of solution = 556.5 gm
Vol. conc $NH_4OH$ = 133.5 cc
Time of Addition = 44.0 min
Calculated % neutr. = 95.0%
Calculated final solids = 17.5%

Second Neutralization

Wt. hydrogel chunk = 566.5 gm
Conc $NH_4OH$ in soak, 70.0 cc Final pH of soak = 8.2

Washing

Time = 21.0 hr
Exchanged with ethanol in eight soak/drain steps
Vacuum oven = 114.0° C.

Product Analysis

TV = 12.8%
PV = 1.25 cc/gm
BET SA = 395.0 $m^2$/gm
APD = 127Å
Cr = 2.2%

EXAMPLE III

The procedures of Example I were followed with the indicated differences. The first solution was divided into three portions and to each portion additional ingredients were added before the first neutralization in order to vary the P/Al.

| Initial Ingredients: | | | |
|---|---|---|---|
| Al(NO$_3$)$_3$.9H$_2$O | | 1200.0 gm | |
| NH$_4$H$_2$PO$_4$ | | 368.0 gm | |
| H$_2$O | | 144.0 gm | |
| Divided Solution: | A | B | C |
| Wt. of Solution (gm) | 535.0 | 535.00 | 535.0 |
| Extra H$_2$O (cc) | 15.0 | 5.00 | 0.0 |
| Extra Al(NO$_3$)$_3$.9H$_2$O (gm) | 0.0 | 15.00 | 41.6 |
| Calculated P/Al | 1.0 | 0.96 | 0.9 |
| First Neutralization: | A | B | C |
| Vol. conc NH$_4$OH (cc) | 132.5 | 146.0 | 157.5 |
| Time of Addition (min) | 38.0 | 42.0 | 36.0 |
| Gel pH | 2.6 | — | — |
| Calc. % neutr. | 105.0 | 109.0 | 107.0 |
| Calculated final solids | 18.2% | 18.1% | 17.8% |
| Second Neutralization: | A | B | C |
| Aging (hr.)* | 4.0 | 4.0 | 3.0 |
| Wt. chunks (gm) | 556.0 | 596.0 | 631.0 |
| Conc NH$_4$OH in soak (cc) | 65.0 | 70.0 | 75.0 |
| Final pH of soak | 8.4 | 8.4 | 8.4 |
| Washing: | | | |
| Time | | 26.0 hrs | |
| Exchanged with ethanol as in Example II. | | | |
| Vacuum oven | | 168.0° C. | |
| Product Analysis: | A | B | C |
| Calculated P/Al | 1.00 | 0.96 | 0.90 |
| TV (%) | 15.30 | 13.20 | 16.70 |
| PV (cc/gm) | 1.43 | 1.45 | 1.44 |
| BET SA (m$^2$/gm) | 348.00 | 378.00 | 408.00 |
| APD (Å) | 164 | 153 | 141 |

EXAMPLE IV

The procedures of Example I were followed, with the indicated differences. The first solution was divided into four portions, with the speed of addition of NH$_4$OH in the first Neutralization differing for each portion.

| Initial Ingredients: | | | | |
|---|---|---|---|---|
| Al(NO$_3$)$_3$.9H$_2$O | | 1604.4 gm | | |
| NH$_4$H$_2$PO$_4$ | | 483.0 gm | | |
| H$_2$O | | 189.0 gm | | |
| Calc P/Al | | 0.98 | | |
| First Neutralization: | A | B | C | D |
| Wt. of Soln. (gm) | 542.0 | 542.0 | 542.0 | 542.0 |
| Vol. conc NH$_4$OH (cc) | 124.0 | 125.0 | 125.0 | 122.0 |
| Time of Addition (min) | 42.0 | 35.0 | 31.0 | 34.0 |
| Gel pH | 3.0 | — | — | — |
| Calculated % solids | 18.8 | 18.8 | 18.8 | 18.8 |
| Calc. % neutr. | 96.0 | 97.0 | 97.0 | 94.0 |
| Second Neutralization: | A | B | C | D |
| Aging (hr.) | 4.0 | 4.0 | 4.0 | 4.0 |
| Wt. chunks (gm) | 543.0 | 549.0 | 572.0 | 555.0 |
| Conc NH$_4$OH in soak (cc) | 70.0 | 70.0 | 70.0 | 70.0 |
| Final pH of soak | 9.1 | 9.1 | 9.0 | 9.1 |

Washing

The four portions were washed as in Example I for 24 hours, exchanged with ethanol as in Example II and then combined into one batch which was dried overnight in a vacuum oven at 196° C.

Product Analysis
Calc. P/Al = 0.98
TV(%) = 12.60
PV (cc/gm) = 1.53
BET SA (m$^2$/gm) = 363.00
APD (Å) = 169

EXAMPLE V

This Example demonstrates the utility of catalysts prepared from the materials made in Examples II and III(B) for the polymerization of ethylene. The material from Example II already contained chromium as the catalytically active ingredient, incorporated by co-gelling. The second catalyst was prepared from product B of Example III by post-impregnation with chromium by wetting 46.0 gm of product III(B) with 64.0 cc of a Cr(NO$_3$)$_3$ solution (0.672% Cr) in 70% isopropanol to incipient wetness, followed by drying in a vacuum oven for 15 hours at 167.0° C. Both catalysts were used in powder form, after pestling and screening through an 80 mesh screen.

For each catalyst preparation, about 30.0 cc of freshly prepared catalyst was fluidized in a 4.5 cm (diameter) quartz tube having a sintered frit to support the sample. The fluidizing medium was air, predried to less than −100.0° F. (−73.0° C.) dew point by passage through activated silica gel and alumina beds. The fluidized bed was heated at the rate of 400° C./hour to 705° C. and kept at that temperature for five hours. After activation, the quartz tube with the sample was cooled to ambient temperature and the activated catalyst was transferred to a glass container for storage. All handling of the activated material was done under nitrogen.

Evaluation of the activated catalysts for ethylene polymerization activity was done at 101 to 103° C. in a two-liter stirred autoclave. Temperature was held constant to within 0.5° C. by adjusting the pressure of boiling methanol in the jacket surrounding the reactor. After heating the nitrogen-filled reactor to about 102° C., about 0.05 gm activated catalyst was charged under nitrogen blanket, followed by about 1.0 liter liquid isobutane purified through activated charcoal and alumina columns. Stirring was begun and ethylene was supplied on demand to maintain 550.0 psig. Under these conditions, the polyethylene product does not dissolve in the isobutane but remains in slurry form. After the reactor was pressurized, 7.4 cc 1-hexene were added and the reaction was allowed to proceed. It was terminated by venting off isobutane and excess ethylene from the reactor. The conditions and results of the two tests are as follows:

| | Catalyst II | Catalyst III (B) |
|---|---|---|
| Reaction temperature (°C.) | 101.0 | 103.0 |
| Catalyst wt (gm) | 0.064 | 0.055 |
| Reaction time (min) | 164.0 | 90.0 |
| Polyethylene (gm) | 224.0 | 57.0 |
| Melt Index[1] | 0.01 | — |
| High Load Melt Index[2] | — | 8.9 |

[1]ASTM Proc. D1238-79, Cond. E, Proc. A.
[2]ASTM Proc. D1238-79, Cond. F, Proc. B.

The results demonstrate that both aluminum phosphate supports tested yield polymerization catalysts which can produce large quantities of polyethylene in short reaction times.

EXAMPLE VI

A solution of the following was prepared according to the procedures described below:

| | |
|---|---|
| 9,626.4 gm | $Al(NO_3)_3 \cdot 9H_2O$ |
| 2,898.0 gm | $NH_4H_2PO_4$ |
| 1,134.0 gm | D.I. $H_2O$ |
| 13,658.4 gm | Total |

In a covered container, the aluminum nitrate and water were mixed and heated to 80° C. to form a clear solution. The ammonium phosphate was added and the solution heated back up to 80° C., then cooled to room temperature.

The prepared solution was pumped (at a flow rate of 250.0 gm/min), with ammonium hydroxide (29.0%) (at a flow rate of 47.7 gm/min), into a 200 cc reactor with two inlet streams and extremely turbulent mixing. High aluminum nitrate/ammonium phosphate concentration and low ammonium hydroxide concentration were used to prevent precipitation. The run-off pH was 2.10. The reactor was cooled to 53°-55° C. and held at that temperature during the run. Run-off from the reactor appeared very slightly white, translucent and with few small white particles floating in it. Correct sol began setting within five minutes.

The gel was aged for approximately 18 hours, then cut into one-inch chunks and soaked in an ammonium hydroxide solution prepared according to the following:

| | |
|---|---|
| 12,000.0 gm | "as-is" gel |
| 1,700.0 gm | 29.0% ammonium-hydroxide |
| 10.0 gal | D.I. $H_2O$ |

The gel was soaked for 18-24 hours with occasional agitation. The pH of the liquid after soaking was 8.7-9.0. The liquid was drained and the hydrogel washed with ammonium hydroxide (pH 10) at 85° C. for 29 hours. The wash flow rate for 12,000.0 gm gel was 550-600 cc/min. After washing, the liquid was drained and the gel allowed to cool in a covered tank.

The hydrogel was then exchanged with ethanol by pouring 10.0 liters of ethanol over 12,000.0 gm gel and agitating occasionally. The ethanol was drained after 2-3 hours. This ethanol exchange step was repeated eight times. The seventh exchange was allowed to set overnight. After eight exchanges, the gel was drained completely and put into a hot vacuum oven (150° C.). After two hours, the temperature was increased to 200° C. After drying overnight, the gel was removed from the oven and sized so the final product would pass through an 80 mesh screen, staying on a 270 mesh screen. The final product was found to have the following properties:

TV (at 1750° F.) = 14.3%
PV = 1.42 cc/gm
BET SA = 267.0 m²/gm
APD = 213Å
P/Al = 0.82

EXAMPLE VII

Following the procedures of the second preferred embodiment, 273.0 kg $Al(NO_3)_3 \cdot 9H_2O$ solution were added to a stainless steel tank, agitated and heated with steam on the jacketed tank. At about 35°-40° C., 50.0 kg $NH_4H_2PO_4$ crystals were added over a 10 minute period. Agitation was continued, with heating to 60° C. The solution was held at that temperature for 30 minutes and then cooled to ambient temperature. The calculated P/Al ratio was 0.94.

First Neutralization—Next, 22.5 gal. of the cooled solution were charged to a 40 gallon jacketed kettle equipped with a portable Lightning mixer and a sparge ring fixed at the bottom of the vessel, through which nitrogen or anhydrous ammonia gas could be sparged. The solution was agitated and sparged with $N_2$. The $NH_3$ flow was started at 29-30 SLPM and the $N_2$ flow cut off. Agitation was continued and cooling water applied to the vessel jacket. About 6800 liters $NH_3$ were required for 100% neutralization, taking about 3 hours 50 min. for gelation. At gelation, the solution viscosity increased rapidly, stopping the mixer. $NH_3$ flow was continued. The mixer was removed and the gel manually broken up and mixed for about 5 min. to allow further contact between the gel and the sparging $NH_3$. The $NH_3$ flow was then cut off and the gel allowed to set for one hour to harden.

Second Neutralization—The aluminum phosphate hydrogel was added to a tank containing aqueous ammonium hydroxide solution at 80° C., gently agitated for 3-5 min., and held at that temperature for 4 hours. The solution was agitated for 5-10 seconds every half hour. Ammonia fumes were vented. The liquid was then carefully decanted to minimize entrained solids.

Washing/Drying—The hydrogel was washed by adding 45 gal. D.I. water and heating to 45° C. Next, 2 liters 30% aqueous $NH_4OH$ were added and agitated for about 5 min. Heating was continued to 80° C. and the wash was held for about 30 min. The liquid was decanted and the gel dewatered by filtering. The wet gel was slurried with 355 lb. isopropanol and dried in a Torusdisc ® drier (Bepex Corporation). The dried gel was calcined in an electrically heated rotary calciner for 45 min. at 1155° F. The final product was found to have the following properties:

TV (at 1750° F.) = 3.0%
$N_2$ PV = 1.24 cc/gm
Hg PV = 1.42 cc/gm
BET SA = 233.0 m²/gm
APD = 214Å
P/Al = 1.03

The principles, preferred embodiments and modes of operation of the present invention have been described in the foregoing specification. The invention which is intended to be protected herein, however, is not to be construed as limited to the particular forms disclosed, since these are to be regarded as illustrative, rather than restrictive. Variations and changes may be made by those skilled in the art without departing from the spirit of the invention.

We claim:

1. A homogeneous, single-phase amorphous aluminum phosphate composition in which phosphorus and aluminum are present in a ratio of from about 0.8:1 to about 1:1 and which is characterized by a total pore volume of at least about 1.0 cubic centimeters per gram and a surface area of between about 200 and about 400 square meters per gram, the combination of pore volume and surface area yielding an average pore diameter of at least about 125 Angstroms.

2. The composition of claim 1 in which the ratio of phosphorus to aluminum is approximately 1:1.

3. The composition of claim 1 in which the total pore volume is at least about 1.3 cubic centimeters per gram.

4. The composition of claim 1 which has an average pore diameter of at least about 150 Angstroms.

5. The composition of claim 1 which comprises one or more catalytically active agents.

6. The composition of claim 5 in which said catalytically active agent is chromium.

7. The composition of claim 6 which further comprises boron, silicon or titanium.

8. The composition of claim 1 which is prepared by:
   (a) dissolving one more aluminum salts and one or more phosphate salts in water to form an acidic solution having a P/Al ratio of about 0.8:1 to about 1:1,
   (b) partially neutralizing the acidic aqueous solution by the slow addition of base with vigorous agitation,
   (c) allowing the partial neutralized solution to gel thereby forming a hydrogel,
   (d) neutralizing the hydrogel formed in step (c) by soaking the hydrogel in an aqueous basic solution of sufficient strength to yield an end pH of about 8.0 to 9.0,
   (e) washing the neutralized hydrogel of step (d) with a dilute base at about 60°-90° C. for about 10-30 hours,
   (f) exchanging the washed hydrogel with alcohol, acetone or ethyl acetate, and
   (g) drying the hydrogel of step (f) to obtain said composition.

9. The composition of claim 8 in which the pH of the partially neutralized solution of step (b) is less than about 5.0.

10. A process for preparing high pore volume homogeneous aluminum phosphate composition, said process comprising:
    (a) forming an acidic aqueous solution of one or more aluminum salts and one or more phosphate salts, said solution having a P/Al ratio of about 0.8:1 to about 1:1,
    (b) partially neutralizing the acidic aqueous solution by the rapid addition of ammonia gas, with mixing, until gelation occurs thereby forming a hydrogel,
    (c) neutralizing the hydrogel formed in step (b) by soaking the hydrogel for at least about 2.0 hours in a concentrated aqueous basic solution of sufficient strength to yield an end pH of about 8.0-9.0 at a temperature of about 60.0 to 90.0° C.,
    (d) washing the neutralized hydrogel in water or dilute ammonium hydroxide solution,
    (e) exchanging the washed hydrogel with alcohol, acetone, or ethyl acetate, and
    (f) drying the exchanged hydrogel to obtain the composition.

11. The process of claim 10 further comprising
    (g) calcining the dried hydrogel by heating the dried gel to at least about 1000° F.

12. The process of claim 10 in which the neutralization of step (c) is performed by soaking for at least about 4 hours.

13. The process of claim 10 in which said temperature is about 85.0° C.

14. A process for preparing high pore volume, homogeneous aluminum phosphate compositions comprising:
    (a) forming an acidic aqueous solution comprising aluminum nitrate, aluminum chloride hydrate, aluminum bromide, aluminum bromate, aluminum chlorate or aluminum iodide hydrate, and orthophosphoric acid, ammonium phosphate or ammonium phosphate, dibasic, sail solution having a P/Al ratio of about 0.8:1 to about 1:1,
    (b) partially neutralizing the acidic aqueous solution by the rapid addition of ammonia gas, with mixing, until gelation occurs,
    (c) neutralizing the hydrogel formed in step (b) by soaking said hydrogel in a concentrated aqueous ammonium hydroxide or sodium hydroxide solution at a temperature of about 60.0 to 90.0° C.,
    (d) washing the neutralized hydrogel in water or dilute ammonium hydroxide solution,
    (e) exchanging the washed hydrogel with alcohol, acetone or ethyl acetate, and
    (f) drying the exchanged hydrogel to obtain the composition.

15. The process of claim 14 further comprising
    (g) calcining the dried hydrogel by heating the dried gel to at least about 1000° F.

16. The composition of claim 1 which is prepared by:
    (a) forming an acidic aqueous solution of one or more aluminum salts and one or more phosphate salts, said solution having a P/Al ratio of about 0.9:1 to about 1:1,
    (b) partially neutralizing the acidic aqueous solution by the rapid addition of ammonia gas, with mixing, until gelation occurs,
    (c) neutralizing the hydrogel formed in step (b) by soaking for at least about 2 hours in a concentrated aqueous basic solution at a temperature of about 60.0 to 90.0° C.,
    (d) washing the neutralized hydrogel in water,
    (e) exchanging the washed hydrogel with alcohol, acetone or ethyl acetate, and
    (f) drying the exchanged hydrogel to obtain the composition.

* * * * *